May 5, 1931. N. C. CHRISTENSEN 1,803,792
METHOD AND APPARATUS FOR SPRAYING FLUID PULPS
Filed Nov. 24, 1926
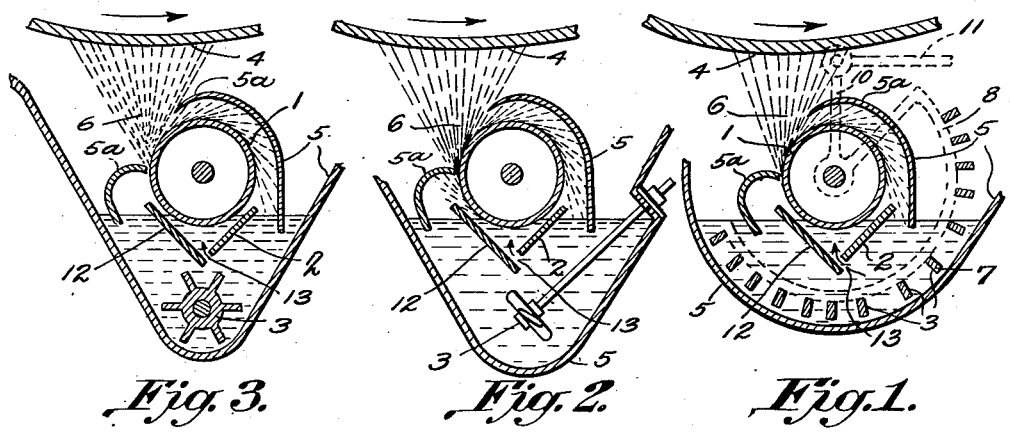
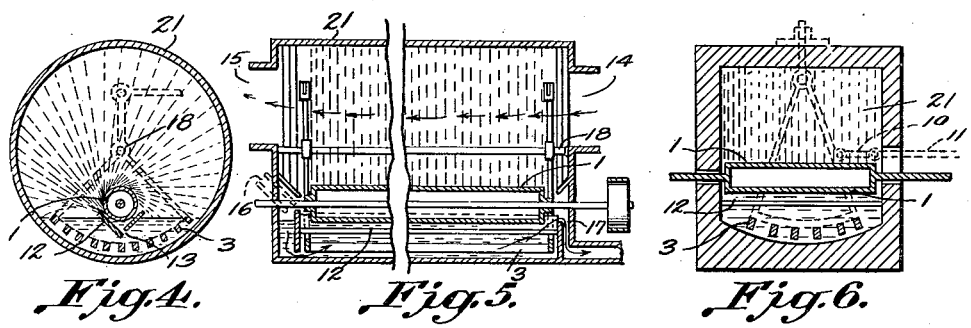
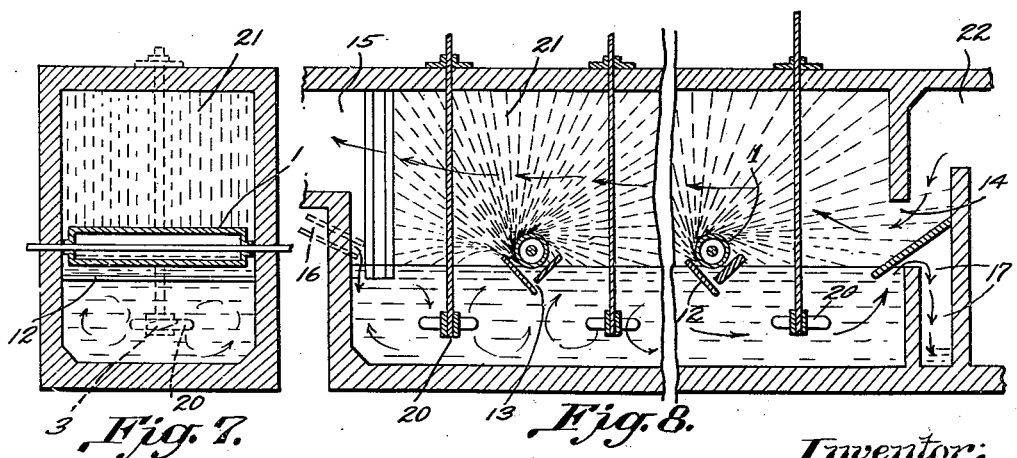
Inventor:
Niels C. Christensen Patented May 5, 1931

1,803,792

UNITED STATES PATENT OFFICE

NIELS C. CHRISTENSEN, OF SALT LAKE CITY, UTAH

METHOD AND APPARATUS FOR SPRAYING FLUID PULPS

Application filed November 24, 1926. Serial No. 150,580.

This invention relates to methods and apparatus for making a spray from fluid mixtures of liquids and finely divided solids and also for bringing such spray into intimate mixture with gases or vapors.

As is well known to engineers engaged in work in the chemical and metallurgical fields, the formation of a suitable spray from fluid pulps, i. e., mixtures of finely divided solids with various liquids, and the bringing of such spray into intimate mixture with gas or vapors for various purposes, would make possible the carrying out of a great many operations and processes in these industries with far greater economy and efficiency than is otherwise possible to obtain and would make possible the use of many methods and processes otherwise practically impossible.

The handling of fluid pulps in such a way as to make a spray therefrom or the bringing of the pulp into intimate contact with gases or vapors in the form of a spray presents a great many practical difficulties. The making of spray from such material by means of nozzles is practically impossible due to the clogging of the fine apertures in the nozzles and if it is possible to prevent clogging the wear upon the nozzle, due to the abrasive action of the solids passing through the relatively fine opening, is generally very excessive even with dilute pulps. The bringing into intimate contact of fluid mixtures of solids and liquids with gases or vapors is also very difficult or expensive and inefficient as a rule. Towers such as are used in acid absorption, water cooling, etc., are impractical due to settling out and building up of solids upon the tower filling causing clogging and channelling. The passage of gas bubbles through the fluid mixture by means of porous bottoms in tanks or porous tubes or plates suspended in the pulp, requires an excessive amount of power and is subject to trouble due to settling out of the solids in "dead" areas and clogging of the porous medium with the solids from the pulp with which it is in contact, and also from solids carried in suspension in the gases passed through the medium.

The efficient spraying of fluid pulps may be utilized for many purposes, such as the throwing of a uniform layer of pulp upon a filter medium, or upon the surface of a drum dryer. The efficient spraying of a fluid pulp together with the intimate mixture of such spray with gases or vapors may be used for many other purposes among which may be mentioned the aeration of various pulps to secure oxidation, the absorption of acids or ammonia from gases directly in the pulp, the heating of pulps and the heating of pulps and evaporation of water therefrom by the direct action of hot furnace gases, the cooling of pulps in order to secure the precipitation of compounds from solution in the pulps, etc.

From the foregoing it will be apparent that the handling of fluid pulps so as to make a spray therefrom or so as to secure an intimate mixture of the pulps with gases or vapors for any purpose by the methods and apparatus now in common use for the handling of liquids, is attended with many difficulties and in many cases is entirely impractical and even when practical is expensive and cumbersome. It will also be apparent that a simple and efficient method and apparatus for making a spray from a fluid mixture of finely divided solids and liquids would be of great value in many industries and would not only fill a long felt want but would also make possible many new methods and processes of treatment.

By my method and apparatus I aim to overcome the difficulties mentioned in the foregoing and to make an efficient spray from fluid pulps by means of a simple apparatus with the expenditure of a minimum of power and in a form of apparatus in which the difficulties due to the clogging and settling are either eliminated or handled without difficulty—and to bring such spray into intimate mixture with gases or vapors in a simple efficient and practical manner. This will appear in the following description:

The main part of the apparatus and the method of its operation are described in my U. S. Patent No. 1,462,363 and reference is made therein to its use for the spraying of fluid mixtures of finely divided solids and liquids as well as ordinary liquids and solutions, and various applications and arrangements of the apparatus are briefly described and figured. As noted in U. S. Patent No. 1,462,363 the apparatus consists of a relatively smooth cylinder arranged to rotate around a central horizontal axis or shaft with the lower part of the cylinder dipping slightly into a body of the fluid mixture to be sprayed, i. e. so that the drum is nearly tangent to the upper surface of the body of liquid from which the spray is thrown. As fully noted in the said patent the proper speed of revolution of the cylinder will depend upon the diameter of the cylinder and the character of the spray desired. The peripheral speed of the cylindrical surface will be approximately the same for cylinders of different diameter to secure approximately similar results. For example, the number of revolutions required for spraying with a cylinder twelve inches in diameter may vary from five hundred to over a thousand revolutions per minute depending on the character and volume of spray desired, while for approximately similar results the number of revolutions used with a cylinder eighteen inches in diameter will vary from 335 to 650 revolutions per minute. As also noted in the patent mentioned the character and volume of the spray will vary with the depth of dipping of the cylinder into the fluid. The deeper the cylinder dips the coarser the spray and the greater the volume, and the faster the peripheral speed the finer the spray and within limits the greater the volume of spray.

As noted in U. S. Patent No. 1,462,363 the forms of the complete apparatus in which the above described method and apparatus for making a spray are used will depend upon the purposes for which the spray is to be utilized. If the spray is to be used for washing or wet screening a limited part of the spray may be used as shown in the drawings in U. S. Patent No. 1,467,355, or if for making froth from fluid or pulps for the flotation of minerals the spray may be confined in a relative small space as shown in U. S. Patent No. 1,521,277. If used for solar evaporation the spray may be unconfined and if used for heating or evaporation by direct contact with hot gases, or for acid absorption, or for air conditioning or dust scrubbing the spray may be confined in a suitable housing which is filled with the spray and through or into which the gases are passed to secure an intimate mixture with the spray, as shown and described in U. S. Patents No. 1,462,363 and No. 1,544,130. As noted in these patents, in the cases where air or gases are passed through the spray for any purpose, the gases may pass through the spray in a direction parallel to the axis of rotation of the cylinder or at right angles thereto. In cases where it is desired to secure uniform and positive countercurrent flow of fluid mixture and gases in contact with each other the flow of gas and fluid mixture may be in opposite directions parallel to the axis of the spray cylinder, and the housing will be so arranged as to secure such a flow. If such a counter-current flow is not necessary, the gases may be passed through the spray at right angles to the axis of the spray cylinder and the housing may be arranged to secure such flow. As also noted a less regular and positive counter-current flow of gas and fluid mixture may be secured by placing a number of spray cylinders at intervals in a horizontal spray tunnel with the axes of the cylinders at right angles to the long axis of the tunnel and then passing the fluid and gases through the tunnel in opposite directions; concurrent flow may be secured by passing the gases and fluid mixtures through the tunnel in the same direction.

All the foregoing data and the methods of arrangement and various forms of the apparatus described in the above mentioned U. S. patents as arranged for different purposes, are just as applicable to the spraying of fluid mixtures of finely divided solids with liquids as to the spraying of liquids in which no solids are suspended. For example, the various forms of the apparatus may be used for spraying sewage pulps for aeration of ore pulps, spraying ore pulps for flotation, spraying pulps to be filtered or dried onto the surface of a moving filter medium or onto the moving surface of a drum drier in order to secure a uniform cake or coating, spraying emulsions of solids with liquids for the absorption of acid gases for the formation of soluble or unsoluble chemical compounds, or for the absorption of acid gases or other gases (as for example, the manufacture of $CaSo_3$, or $Ca(SH)_2$ from a lime emulsion and $SO_2$ or $H_2S$ gases, or the removal of $H_2S$ from artificial fuel gas with an emulsion of $Fe_2O_3$ in water, the leaching of copper ores with $SO_2$ or $HCl$ solutions by direct absorption in the fluid pulp of the $SO_2$ or $HCl$ from furnace gases), the spraying of ore or chemical pulps so as to heat them by direct passage of hot furnace gases through the pulp spray (for heating or evaporation or both) or for cooling a hot pulp by the same method as noted in my U. S. patent application No. 227,244.

As noted in U. S. Patent No. 1,462,363 the method and apparatus described in the foregoing is applicable to any fluid mixtures which will wet the spray cylinder, the only considerable difference in the operation of the apparatus with liquids and with fluid mixtures of finely divided solids in liquids is that provision must be made to prevent settling of the solids by suitable methods of agitation and, due to the agitation thus required particularly with rapidly settling mixtures, provision must be made to prevent excessive agitation of the body of the pulp in contact with the spray cylinder The combination of these auxiliary features with the spray cylinder and housing and the specific application of the apparatus to the spraying of fluid mixtures of solids and for various purposes is illustrated in the accompanying drawings and briefly described in the following:

Figures 1, 2 and 3 illustrate the method of using the spray device for applying fluid pulp to the surface of a filter or drum dryer (or other similar surfaces). These figures (1, 2, 3) are vertical sections perpendicular to the axis of the spray cylinder and filter or dryer drum, or other similar device. Fig. 2 shows a propeller type agitator and Fig. 3 a submerged paddle type agitator instead of the rocker type of Fig. 1. Fig. 4 shows a cross section and Fig. 5 a longitudinal section of the countercurrent type of apparatus in which the flow of pulp and gases is parallel with the axis of the spray tunnel and spray cylinders. Fig. 7 and Fig. 8 are respectively a cross section and a longitudinal section of the apparatus in which the spray cylinders are placed transverse to the flow of gases and pulp and to the longer axis of the spray tunnel. Fig. 6 shows a reciprocating type agitator instead of the propeller type shown in Figs. 7 and 8.

As shown in these sketches, for use with fluid mixtures of finely divided solids and a liquid, the complete apparatus includes two auxiliary parts not ordinarily necessary when spraying liquids alone: These consist of an agitator (3) of any suitable kind, designed and arranged to prevent the settling out of the solids suspended in the fluid mixture. As previously noted in the foregoing and in U. S. Patent No. 1,462,363 the action of the spray impeller, in removing the fluid to be sprayed from the main body of fluid mixture, is so gentle that with most pulps the agitation would be insufficient to keep the solids in suspension. Some form of agitating or stirring mechanism is therefore necessary to prevent this segregation or settling. This agitation of the main body of pulp makes necessary the second auxiliary part which consists of a suitable baffle arrangement (2) beneath the spray impeller (1) to prevent excessive agitation of the fluid in contact with the spray impeller and at the same time to allow a free flow of fluid from the main body of fluid into contact with the spray cylinder. Any suitable form of these auxiliary parts may be used, some of the possible forms being shown in the accompanying drawings.

The method and apparatus for spraying a fluid pulp onto a moving surface is illustrated on Figs. 1 to 3. This form of the spray device may be used for applying a uniform coating of a fluid pulp to the surface of a rotary drum filter or a rotary drum dryer, or for applying a uniform coating of any fluid emulsion to a moving surface. In the forms shown the device consists of the spray cylinder (1) which is placed in relatively close proximity to the moving surface (4) of the filter, dryer, or other device upon which the fluid mixture is to be sprayed. The cylinder (1), which is driven by a pulley as shown in Figure 2 or any other suitable driving mechanism, and is enclosed by a suitable housing (5) arranged to hold a small supply of liquid in the bottom thereof and to return all of the sprayed fluid except that passing out of the opening (6) in this housing through which the spray is thrown onto the passing surface (4). In the bottom of this housing a suitable agitator (3) is arranged to prevent settling or segregation of the pulp. This auxiliary part of the device may consist of an ordinary submerged paddle agitator as shown in Fig. 3, or a propeller type agitator as shown in Fig. 2, or may consist of a reciprocating type such as shown in Fig. 1. This last mentioned type of agitator consists of a number of narrow radial plates (7) attached at each end to a circular supporting pieces (8) which are attached by suitable radial arms to a suitable sleeve (shown dotted) on the shaft at the end of the spray cylinder but inside of the housing. The rocker arms (10) are attached to the sleeves (9) (which project from the housing) outside of the housing and are moved back and forth by the rod (11) so as to keep the pulp in state of sufficient agitation to prevent settling. To prevent excessive agitation of the fluid immediately in contact with the spray cylinder (1) which would cause surging and irregularity in the spraying action, a small V-shaped trough (12) is placed in the body of fluid immediately beneath the cylinder. As shown in the sketches the sides of the trough extend up slightly above the level of the surface of the fluid so as to prevent any waves or surges of liquid reaching the spray cylinder and a longitudinal slot (13) in the bottom of the trough allows a free flow of fluid into the space beneath the spray cylinder (1) and also allows any solid material which might settle to flow out into the main body of pulp. Other forms of baffles may also be used, but the one described has proved satisfactory and is a form which is easily installed and is preferable to more complicated forms of baffles. With very fine solids which settle very slowly neither the agitator (2) or baffle arrangement (3) or (2) may be necessary. Suitable deflectors (5a) cut off those portions of the spray which are not useful for spraying the surface (4) of the cylinder or drum to be coated.

When the spray device is to be used for bringing the fluid mixture of finely divided solids and liquid into intimate contact and mixture with gases, the form of the apparatus will depend on the particular use to which it is put. In general the forms of the apparatus will be similar to those described in U. S. Patent No. 1,462,363 except that with materials which settle rapidly the agitator (2) and baffle arrangement (3) will be necessary. The form of housing used will depend on the desired conditions of operation.

Figures 4 and 5 show a type of housing (21) and an arrangement suitable for securing a uniform counter-current of fluid and gases such as might be used in absorbing acid gases (or ammonia) in a pulp in a leaching process. The apparatus consists of the spray cylinder (1) enclosed in the housing (21) with the gas inlet (14) at one end and gas outlet (15) at the other end, and the pulp inlet (16) and overflow outlet (17) at opposite ends so as to secure a counter-current flow of gas and pulp as indicated by the arrows. The agitator (3) is arranged to keep the pulp in suspension as previously noted and the baffle trough (12) prevents disturbance of the pulp beneath the spray rotor as noted above.

For operations in which a less perfect counter-current of pulp and gases is desired, the arrangement shown in Figs. 7 and 8 may be used. In this arrangement, as previously noted, the spray cylinders are placed transverse to the spray tunnel or housing (21) and the flow of pulp and gases is at right angles to the axis of the spray cylinder. For small operations in which no counter-current effect is desired a single spray rotor (1) may be used. For larger operations the spray tunnel (21) may be made of any desired length with a number of spray drums (1) spaced at suitable intervals as indicated in Fig. 8. Each of the cylinders (1) may have a suitable baffle arrangement (12) to prevent surging or disturbance of the pulp to be sprayed, and a number of suitable agitators (3) for keeping the solids in suspension. To secure a counter-current effect the pulp may be introduced at one end and the gases at the opposite end, the gases and pulp passing through the tunnel in opposite directions. Any suitable type of agitator may be used. Fig. 6 shows a form of reciprocating agitator similar to that described in Fig. 1 except that agitator shaft (18) is placed above the spray rotor and at right angles to the axis of the spray cylinder. The shaft (18) from which the agitator is hung is supported on suitable hangers (19). The agitator is moved back and forth by means of the rocker arms (10) and rod (11). If desired a propeller type agitator of the type shown in Figs. 7 and 8 may be used, the propellers (20) being spaced at suitable intervals between the spray rotors (1). The form of apparatus shown in Figs. 6, 7 and 8 may be used for a variety of operations such as for example: heating and evaporating pulps, an application which may be used in the acid brine leaching processes described in U. S. Patents 1,539,711, 1,539,721 and 1,539,713 in which the concentration and heating of the mixture of brine and ore is necessary before adding the acid in the leaching operation; absorbing acid gases in pulps to form chemical compounds such as in the manufacture of $CaSO_3$ or $Ca(SH)_2$ by passing $SO_2$ or $H_2S$ gases through a spray of fluid emulsion of $Ca(OH)_2$ and water; removing deleterious elements from a gas such as removing $H_2S$ from fuel gas by passing the gas through a spray of fluid mixture of finely divided ferric oxide in water; lixiviating finely divided ores by passing acid gases into a spray of a fluid mixture of the finely divided ore and water, such as in the treatment of oxidized copper ores with $SO_2$ solutions or the treatment of chloridized silver ores with acid brines in which the acid gases from the roasters are used in solutions to dissolve copper and lead and assist in dissolving the silver out of the roasted ore. In most of these applications the flow of pulp and gases through the spray tunnel will be counter-current, the hot furnace gases or acid gases from the fuel furnace or sulphur burner, or roaster (22) passing in one direction through the spray tunnel (21) or housing and the pulp or mixture of solids and solution passing in the opposite direction. A concurrent or parallel flow of gases and pulp may be used if desired and is advantageous in some applications of the device.

Numerous other applications of this method and apparatus for spraying fluid pulps and descriptions of other modifications of the invention for these applications might be mentioned, but the foregoing is sufficient to indicate the wide variety of uses to which the invention may be put and to indicate some of the possible forms of the apparatus for these uses.

Having described my invention, what I claim and desire to patent is:

1. The method of making a spray from fluid mixtures of liquids and finely divided solids which consists in agitating said mixture to keep said solids in suspension and rotating a rapidly revolving horizontal cylinder dipping slightly into said mixture to be sprayed, at such a speed that a portion of said fluid mixture is carried out of the body of said mixture on the surface of said cylinder and is thrown from the surface of said cylinder as a spray.

2. The apparatus for making a spray from fluid mixtures of liquids and finely divided solids which consists of a cylinder arranged to revolve around a horizontal axis, means for agitating said mixture to keep said solids in suspension, means for maintaining a body of such fluid mixture to contact with the lower portion of said cylinder, means for rotating said cylinder at such a speed that fluid mixture will be carried out of the body of said mixture on the surface of said cylinder and will be thrown therefrom as a spray.

3. The apparatus for making a spray from fluid mixtures of liquids and finely divided solids which consists of a cylinder arranged to revolve around a horizontal axis, means for maintaining a body of such fluid mixture to contact with the lower portion of said cylinder, means for agitating said body of such mixture to prevent settling of solids therein, means for maintaining the portion of said body of mixture in contact with said cylinder in a relatively quiet state, means for rotating said cylinder at such a speed that fluid mixture in contact therewith will be carried out of the body of said mixture on the surface of said cylinder and will be thrown therefrom as a spray.

4. The method of making a spray from fluid mixtures of liquids and finely divided solids and of mixing said sprayed mixture with gaseous media, which consists in agitating said mixture to keep said solids in suspension and rotating a rapidly revolving horizontal cylinder dipping slightly into a body of said fluid mixture at such a speed that a portion of said mixture is carried out of said body of mixture on the surface of said cylinder and is thrown from said cylinder as a spray and passing said gaseous medium through said spray.

5. The apparatus for making a spray from fluid mixtures of liquids and finely divided solids and for bringing said spray into contact with gaseous media, which consists of a cylinder arranged to rotate around a horizontal axis, means for maintaining a body of said fluid mixture to contact with the lower part of said cylinder, means for rotating said cylinder at such a speed that fluid mixture will be carried out of said body of mixture on the surface of said cylinder and will be thrown therefrom as a spray, means for agitating said body of fluid mixture to keep said solids in suspension, means for keeping the portion of said body of mixture in contact with said cylinder in a relatively quiet state, a housing enclosing said cylinder and said spray above the pulp level, means for passing said fluid mixture through said housing beneath said cylinder, and means for passing gaseous medium through said spray in said housing.

In testimony whereof I have signed my name to this specification.

NIELS C. CHRISTENSEN.